United States Patent [19]

Kaufman et al.

[11] Patent Number: 4,952,414

[45] Date of Patent: Aug. 28, 1990

[54] YOGURT WITH CRISP CEREAL PIECES

[75] Inventors: Stephen P. Kaufman, Minneapolis; James E. Langler, White Bear Lake; Vinod W. Padhye, Maple Grove, all of Minn.

[73] Assignee: General Mills, Inc., Minneapolis, Minn.

[21] Appl. No.: 403,508

[22] Filed: Sep. 6, 1989

[51] Int. Cl.$^5$ ......................... A23C 9/154; A23C 9/12
[52] U.S. Cl. ..................................... 426/93; 426/103; 426/334; 426/330.2; 426/330.6; 426/570; 426/572; 426/573; 426/579; 426/580; 426/583; 426/601; 426/602; 426/613; 426/621; 426/565
[58] Field of Search .............. 426/93, 103, 334, 330.2, 426/330.6, 570, 579, 572, 573, 580, 583, 601, 602, 613, 621, 565

[56] References Cited

U.S. PATENT DOCUMENTS

| | | | |
|---|---|---|---|
| 3,365,299 | 1/1968 | Willock | 426/93 |
| 4,225,623 | 9/1980 | Stussi | 426/42 |
| 4,305,970 | 12/1981 | Moran et al. | 426/603 |
| 4,370,354 | 1/1983 | Leipold | 426/583 |
| 4,389,426 | 6/1983 | Reissmann et al. | 426/602 |
| 4,404,231 | 9/1983 | den Hollander et al. | 426/602 |
| 4,410,549 | 10/1983 | Baker | 426/43 |
| 4,430,349 | 2/1984 | Malone et al. | 426/34 |
| 4,446,165 | 5/1984 | Roberts | 426/602 |
| 4,450,179 | 5/1984 | Vink et al. | 426/103 |
| 4,468,408 | 8/1984 | Bosco et al. | 426/604 |
| 4,533,561 | 8/1985 | Ward | 426/603 |
| 4,689,238 | 8/1987 | Hitchner | 426/93 |
| 4,820,533 | 4/1989 | Seaborne et al. | 426/93 |
| 4,853,236 | 8/1989 | Langler | 426/102 |

Primary Examiner—Jeanette Hunter
Attorney, Agent, or Firm—John A. O'Toole

[57] ABSTRACT

Disclosed are food products having a first, high moisture portion and second portion comprising crisp, relatively dry materials such as puffed cereal grains or pieces without a discrete interjacent solid barrier. The high moisture phase can be a gelled diary product such as yogurt or pudding. In addition to the puffed cereal pieces, the second portion additionally essentially comprises a defined water-in-oil emulsion throughout which the pieces are dispersed. The emulsion includes a high solids, discontinuous aqueous phase, preferably gelled, dispersed within a low oil content continuous gelled oil phase. The oil phase comprises an edible liquid oil, preferably winterized, which is also gelled. The composite food products exhibit good interphasic stability for the typical refrigerated temperature distribution time periods as well as the maintenance of the relatively crisp texture of the puffed cereal pieces.

26 Claims, No Drawings

YOGURT WITH CRISP CEREAL PIECES

BACKGROUND

1. Technical Field

The present invention relates to food products and to their methods of preparation. More particularly, the present invention relates to dairy products, especially cultured dairy products such as yogurt, which contain added materials of differing texture such as crisp cereal pieces and to their methods of preparation.

2. Background Art

Yogurt is a nutritious dairy product which recently has become quite popular. At retail, yogurt is now available in a wide assortment of varieties of texture, fat content and flavor among other attributes. Other than aseptically packaged yogurt, yogurt is traditionally distributed and consumed with a live culture which requires refrigerated distribution. Broadly, yogurt products fall into either the custard style (i.e., a set firm gel) or the stirred style, i.e., wherein the gel or curd is broken up by stirring. One popular style is fruit-on-the-bottom, also colloquially referred to as "sundae" style in which a layer of fruit preserves is on the bottom of the yogurt container and the custard yogurt fills the rest of the container. Still another style is western style which comprises a bottom layer of fruit preserves plus a top layer of stirred style yogurt. Another style of yogurt comprises a stirred admixture of fruit preserves and yogurt often referred to colloquially as "Swiss" style. More recently, a variation of Swiss style additionally comprises an admixture of nuts and/or partially puffed cereal grains with the yogurt. This yogurt mixture is sometimes referred to as "breakfast" style yogurt. The partially puffed grains and nut pieces give a pleasingly mixed organoleptic texture which is both chewy and crunchy in addition to the creamy mouthfeel of stirred yogurt.

While quite popular, the inclusion of partially puffed cereal grains are not without problems or limitations. Partially puffed cereals grains (i.e., having a bulk density of roughly 0.3 to 0.5 g/cc.) are employed rather than fully puffed cereal grains (i.e., having a bulk density ranging roughly from 0.1 to 0.2 g/cc.). Fully puffed cereal grains or pieces (2.5% moisture) being considerably drier than the high moisture yogurt (90% moisture) absorb moisture over time resulting in a loss of crispness and the development of a soggy texture. Partially puffed cereal grains, however, tend to remain chewy notwithstanding moisture absorption. It would be desirable to provide yogurt products comprising the more crunchy, crisp, fully puffed cereal grains or other relatively dry, puffed pieces such as puffed cereal dough pieces rather than being merely chewy.

The food art includes many attempts at the inclusion of one relatively drier material dispersed throughout a second material which is relatively more moist. Generally, the success of such approaches depends, inter alia, primarily in the water activity differential between the two differing materials with severity directly proportional to this differential. Providing a product ($A_w$ of 0.7 to 0.9) comprising yogurt and puffed cereals, ($A_w$ of 0.1 to 0.3) or similarly dry materials, e.g., ready-to-eat cereal pieces, especially puffed cereals, presents an enormous challenge since the two materials differ so greatly in water activity.

One successful approach involves the complete segregation of the two different materials into separate containers. Although successful, this solution lacks convenience, is expensive and can result in increased packaging waste. The art also includes numerous attempts at the provision of dual compartmented containers with an intermediate barrier, usually inedible, but sometimes with an edible barrier, (see, for example U.S. Pat. No. 4,820,533 issued Apr. 11, 1989 to Seaborne et al.). Again, while successful, such products are not as convenient or as inexpensive as a single container.

Still another approach has been to include an edible coating to the drier food pieces. Edible, solid fat-based coatings have been tried many times. Barrier effectiveness increases with fat hardness and coating thickness. However, solid waxy clumps of fat are not organoleptically or nutritionally appealing additions to yogurt whether or not they contain crisp cereal pieces. Furthermore, such barriers exhibit only limited protection over time. The fat-based barriers tend to develop cracks or pinholes over time. Thinner barriers sometimes employing shellac-based coating compositions have also been tried, (see, for example, U.S. Pat. No. 4,710,228 issued Dec. 1, 1987 to Seaborne et al. entitled Edible Coating Composition and Method of Preparation). However, these materials work best on smooth surfaced pieces. Irregular surfaced pieces such as puffed cereal grains are difficult to coat effectively.

Given the present state of the art in the provision of high moisture foods, there is a continuing need for new and useful ways to provide an admixture of high moisture and low moisture foods which provide the desirable organoleptic texture contrasts and which are convenient to use and consume yet maintain their disparate texture over conventional distribution and storage times and conditions.

Surprisingly, the above difficulties and limitations have now been overcome and the present invention satisfies a long felt need to develop yogurt products, especially sundae and/or western styles, having crisp, relatively dry cereal pieces but without a discrete intermediate barrier. The present invention resides partially in the dispersion of the dry pieces in an emulsion matrix comprising a specially defined water-in-oil ("w/o") emulsion. The emulsion essentially comprises a high solids water phase in a continuous, liquid oil phase which oil phase is gelled.

SUMMARY OF THE INVENTION

In its product aspect, the present invention resides in food products having a high moisture portion, especially gelled or thickened dairy products such as yogurt, and a second portion segregated from the first portion but without a discrete solid interjacent barrier that comprises relatively drier materials such as puffed cereal grains or pieces. The second portion additionally essentially comprises a defined, low fat w/o emulsion matrix throughout which the pieces are dispersed.

In its article aspect, the present invention provides a packaged food article in a single compartment container without an intermediate, discrete physical barrier between the two food portions.

In its method aspect, the present invention resides in methods for maintaining the dryness and crispness of dry pieces in heterogeneous high moisture food product. The present methods include the steps of segregating the cereal pieces within a portion of the container and enveloping the pieces within a matrix of a specially defined water-in-oil emulsion.

DETAILED DESCRIPTION OF THE INVENTION

In its product aspect, the present invention relates to composite food products especially yogurt having a high water activity phase or portion and a second phase or portion comprising a low water activity material but without a discrete intermediate barrier. The second portion additionally essentially includes a defined water-in-oil emulsion as a matrix throughout which the dry pieces are dispersed.

Each of these product components as well as product preparation and use are described in detail below.

Throughout the specification and claims, percentages are by weight and temperatures in degrees Fahrenheit unless otherwise indicated.

A. Yogurt Phase

The present products essentially comprise a first phase of a high moisture or high water activity material in the form of a soft gel or thick fluid. The present invention finds particular suitability for use in connection with yogurt. Yogurt, of course, is well known and the art is replete with teachings of useful yogurt compositions and preparation techniques. The skilled artisan will have no difficulty selecting suitable yogurt compositions and preparation methods for use in the present invention. A good general description of yogurt manufacture is given in U.S. Pat. No. 4,797,289 (issued Jan. 10, 1989 to Reddy) which is incorporated herein by reference.

Generally, however, yogurt comprises a cultured milk product produced by culturing one or more dairy ingredients such as whole milk, partially skimmed milk, skim milk, nonfat dry milk and the like with a characterizing bacterial culture containing *Lactobacillus bulgaricus*, a lactic acid-forming rod-shaped bacterium, and *Streptococcus thermophilus*, a coccus-shaped bacterium able to grow and produce lactic acid at high temperatures. The culture may optionally comprise additional culture specie(s) as is well known in the art. The dairy ingredients which collectively define a "yogurt base" are first homogenized and pasteurized at high temperatures and then cooled to about 40° C. to 50° C. Thereafter, the pasteurized, cooled yogurt base is then inoculated with the culture and then fermented to a desired acid content or titratable acidity and pH, e.g., 4.4 to 4.7, at which curdling or coagulation occurs which forms the yogurt. Acid development and bacterial growth are then arrested by cooling the mixture, generally to a temperature of about 0° C. to about 5° C. and storing at these refrigeration temperatures.

Yogurts can vary in texture. Refrigerated yogurt can be either of the thicker type whether of the "firm" or "gel-like" custard variety, or of the smoother stirred variety. The yogurt can also vary in known manner in fat content and can include nonfat, low fat, reduced fat or full fat yogurts.

Presently, the preponderance of refrigerated yogurt in the United States is of the thicker rendered "firm" or "gel-like", whereby the yogurt is processed, packaged and marketed so as to present a product having pudding-like consistency.

Generally, the fermentation step is conducted after packaging. The refrigerated, firm yogurts sometimes exhibit, after a few days standing, a syneresis or bleeding of whey from the body of the yogurt, typically resulting in the presence of a small amount of clear liquid on top of and around the yogurt. This bleeding can be minimized or entirely avoided by increasing the amount of milk solids in the yogurt or by adding suitable stabilizers which increase the firmness of the yogurt.

Another popular style of yogurt is referred to as "stirred style" which is characterized by a more liquid consistency. The process for the preparation of stirred style yogurt differs from that of the preparation of custard style in that the fermentation step is practiced prior to packaging, typically in large vessels with very mild agitation. The yogurt is cooled to stop fermentation and is then mixed gently to form a high viscosity pudding-like product which is then charged to the package. Suitable viscosities range from about 5,000 to 20,000, preferably about 7,500 to 11,000 cps (35° F.).

Additives such as sugar, fruit, colorants, flavorants, high potency sweeteners, (e.g., aspartame, acetylsulfane, sucralose, saccharine, cyclomate, and mixtures thereof in their soluble salt(s) forms) vitamins, minerals, especially calcium salts, and stabilizers may be employed to enhance consumer acceptance of the product. These additives are typically added after the fermentation step is arrested by cooling.

In certain embodiments of the present invention, the stirred style yogurt phase itself can additionally comprise about 0.1% to 25% of the product of fruit preserves and about 0.1% to 10% of the phase, each of nuts, raisins or fruit pieces, dispersed throughout the yogurt or high moisture phase.

Conventionally, the yogurt is unaerated. However, if desired, the yogurt phase can be aerated modestly, i.e., up to a 200% overrun, wherein a conventional aerating agent, i.e., a foaming agent/stabilizer, is added. That is, the first phase can have a density of from about 0.5 to 1.2 g/cc.

While the present invention finds particular suitability for use in connection with yogurt, the skilled artisan will appreciate that the present invention finds suitability in connection with all manner of high moisture, (e.g., $A_w$ of 0.85 to 0.99) high viscosity or thickened foods or gels. Such gels can be other caseinate based gels or based upon other gel systems, e.g., using various hydrocolloids such as gums, alginates, pectins, starch, gelatins, and mixtures thereof. For example, the high moisture phase can be a starch based pudding, a salad dressing, a cheese or cheese sauce, a custard, a mousse, a thickened soup or other high moisture, thick but soft phase which upon routine handling does not admix the emulsion phase.

The first portion can comprise from about 10% to 90% of the present, composite food products. Preferred embodiments, however, comprise about 45% to 75% of the present food products and for best results about 50% to 75%.

B. Emulsion Phase

The present food products additionally essentially comprise a discrete, segregated second portion or phase in direct physical contact with the first phase or portion without the necessity of a separate, distinct, additional solid barrier intermediate therebetween. The second portion is characterized by marked textural and compositional differences in comparison with the first portion. The second portion is perceived as being fluid upon consumption even though at rest the portion may be dimensionally stable, i.e., the second portion can be, it is believed, a thixotropic gel.

In the preferred embodiment, the second portion can be fabricated into a bottom portion of a yogurt product container. In this embodiment, the second portion can comprise about 10% to 90% of the food product. Better results in terms of organoleptic attributes are obtained when the second phase comprises about 25% to 55%, and, for best results about 35% to 45% of the food product.

The second portion essentially comprises an admixture of (1) a defined, particular w/o emulsion matrix, and (2) dry discrete food pieces dispersed throughout the w/o emulsion matrix. The emulsion matrix essentially comprises a water-in-oil emulsion.

1. Matrix W/O Emulsion

The second portion emulsion matrix essentially comprises a novel, particularly defined, low fat content, water-in-oil emulsion ("w/o"). The emulsion's formulation is described in detail in U.S. Ser. No. 169,911 entitled Dual Textured Food Piece of Enhanced Stability by Langler (Attorney Docket No. 4497) recently allowed (3/29/89) and which is incorporated herein by reference. The matrix emulsions essentially comprise: (a) a continuous oil phase, (b) a dispersed aqueous or syrup phase, and (c) at least one emulsifier for the present w/o emulsions.

a. Oil Phase

The present w/o emulsions essentially comprise a continuous oil phase. The oil phase essentially comprises an edible oil. The oil phase can comprise from as little as about 8% to about 50% by weight of the emulsion. Preferred for use herein are emulsions which comprise about 10% to about 28% by weight oil. For best results in terms of moisture protection and stability, an oil phase content of the emulsion ranges from about 10% to 25%. It is most surprising that a stable w/o emulsion can be formulated with such low concentrations of the continuous oil phase. Within the defined oil phase concentrations, the w/o emulsions provide the benefit of richness or creaminess. However, excessive oil concentrations are not preferred since emulsions with such high oil contents become too rich in taste. If the oil phase concentration is too low, the emulsion can experience emulsion instability. The emulsion can experience inversion which can lead to syneresis or weeping as well as the loss of the texture preservation benefits of the present invention.

It is preferable that the oil be a liquid oil, i.e., have minimal solids at room temperature (21° C.). Unlike other margarine type compositions which have solid fat index values which predominantly are harder fats, it is believed preferable herein that the oil be liquid or largely liquid, at those temperatures to be encountered during storage and distribution. In part, it has been found difficult to prepare w/o emulsions having such low fat contents employing solid fats which are stable at refrigerated temperatures. Furthermore, liquid oils are preferred since emulsions fabricated employing liquid oils are perceived as being more succulent at refrigerated temperatures and are thus organoleptically superior. Accordingly, most preferred for use herein are liquid oils which have been winterized, i.e., cooled and strained so as to remove the fraction which becomes solid at the cooled temperatures. Preferred liquid oil materials are those having the following SFI profile:

TABLE 1

| Temperature | SFI |
|---|---|
| 21° C. | 0% to 16% |
| 10° C. | 7% to 35% |

Any conventional oil, especially vegetable oils can be used, e.g., soybean oil, corn oil, peanut oil, butter oil, and mixtures thereof. Winterized oils are not typically described by SFI profiles, but by clouding times, i.e., the hours at 40° F. before clouding occurs. Preferred for use herein are winterized oils with high cloud times, e.g., 10 hours or better. Also useful herein but less desirable are "plastic" fats or butterfat.

In preferred embodiments, especially for those embodiments wherein the oil content is less than 30%, the oil phase additionally essentially comprises an oil gelling agent sufficient to form a thickened or gelled oil. In more preferred embodiments, the oil phase essentially comprises about 2% to 6% of the oil phase of the fumed silicon dioxide which functions initially to facilitate the blending of oil soluble flavors in the oil phase and, surprisingly, also as an oil phase gelling agent. Better results in terms of texture and mouthfeel are obtained when the oil phase comprises about 3% to 5% fumed silicon dioxide. For best results, the oil phase desirably comprises about 3% of silicon dioxide.

In another even more preferred embodiment, the oil phase additionally essentially includes a polyhydric alcohol ("polyol") or sugar alcohol as a second, auxiliary gelling agent in combination with the fumed silicon dioxide. Surprisingly, the polyol synergistically interacts with the fumed silicon dioxide to cause the liquid oil to gel. In these embodiments the oil phase essentially comprises about 0.1% to 1.5% of polyol. Better results in terms of emulsion stability are obtained when the oil phase comprises about 0.2% to 0.5% and, for best results, about 0.4% polyol. Useful herein as the sugar alcohol is glycerol, sorbitol, propylene glycol, absolute alcohol and mixtures thereof.

The oil phase can optionally additionally include oil soluble flavorants, color, preservatives or vitamins. If present, these adjuvant materials can each comprise about 0.01% to about 8% of the oil phase.

b. Aqueous Phase

The aqueous phase is desirably high in solids, i.e., is a liquid syrup phase essentially comprising water and sufficient amounts of water soluble solids so as to provide the aqueous phase with a water activity ranging from about 0.4 to about 0.8, preferably about 0.3 to 0.7 and for best results about 0.5. The aqueous phase can comprise as water soluble solids materials, low molecular weight, water soluble infusion materials such as, for example, various nutritive carbohydrate sweetening agents, fruit preserves or juice solids or sugar alcohols (especially glycerol and salt). Preferred for use herein are juice solids materials, e.g., concentrated fruit juices or nectars. Useful liquid syrup phases herein comprise about 30% to 90% solids by weight of the aqueous phase, preferably about 65% to 90%, and for best results about 72% to 84%.

In certain more preferred embodiments, the emulsion matrix's aqueous phase can additionally essentially comprise an aqueous phase gelling or thickening agent. In these embodiments the aqueous phase essentially comprises about 0.05% to 5%, preferably about 0.25% to 2% of the aqueous phase of the gelling agent. Embodiments comprising a gelled or at least a thickened aqueous phase beneficially exhibit the properties of greater emulsion stability which is especially desirable at lower emulsion oil levels. The particular concentration of the gelling agent will depend upon such factors as the particular material employed, the type and amount of water soluble materials in the phase, emulsion oil content, and desired organoleptic attributes. For best results, the aqueous phase can comprise about 0.5% to 1.1% of the aqueous phase of a gelling agent. Useful as aqueous phase gelling agents are, for example, gelatin, xanthan, alginates, locust bean, guar, carboxymethyl cellulose, pectin, and mixtures thereof. Preferred for use herein are alginate, pectin, and mixtures thereof.

The aqueous phase is dispersed throughout the emulsion in the form of globules. The particle size of the globules is not critical per se and, generally, is primarily determined by the relative amounts of aqueous and oil phases. The stability of emulsion is, however, favorably influenced when the globules are relatively small and uniform in size.

The aqueous phase desirably comprises about 90% to 50% by weight of the emulsion, preferably 90% to 72%, and for best results about 90% to 85%.

c. Emulsifier

The emulsion additionally essentially comprises at least one emulsifier in amounts sufficient to form the present w/o emulsions. Typically, the emulsifier is added to the oil phase generally, however, prior to addition of the gelling agent. Thus expressed, good results are obtained when the oil phase essentially comprises about 0.1% to 2.5% emulsifier. For better results, the emulsifier desirably comprises about 0.2% to 1.5% of the oil phase and for best results about 1.0%. As indicated above, emulsifiers are well known and selection of useful emulsifiers herein will require no more than routine experimentation. Specific useful emulsifiers, for example, include a liquid polyglycerol oleate (available from Witco Corporation under the trade name Witconol 14-F), a distilled monoglyceride (available from Eastman Chemical Products, Inc. under the trade name Myverol 18-92) and an emulsifier available from Capital City Products under the trade name Caprol 10G40. These materials, like most commercial emulsifiers, are blends of materials and their use is contemplated herein. For emulsifiers solid at room temperature, the oil can be heated to assure proper dispersion.

The emulsion can be of a color not only of a complementary but also in contrast to the color of the first portion. In preferred embodiments, the emulsions are substantially unaerated. While emulsion preparation without some air incorporation is difficult, it is not intended herein to provide aerated or whipped emulsions. It is to be appreciated that certain solid materials, e.g., nut meat pieces, fruit bits, can be optionally added to the matrix without departing from the spirit of the present invention.

2. Dried Cereal Pieces

The dry (i.e., having a water activity less than 0.3) particulate pieces can comprise from about 1% to 25% of the emulsion matrix. Preferred products comprise about 1% to 15% particulate pieces while for best results a particulate concentration of about 5% to 10% is employed.

Especially useful herein for the dry cereal pieces include puffed cereal grains such as rice, wheat, barley, oats, corn, and mixtures thereof, whether fully or partially puffed. Also useful herein are puff pieces fabricated from cereal doughs such as are frequently used in ready-to-eat puffed cereals. Less preferred but useful herein are the cereal pieces such as granola, cereal shreds and flakes. Preferably, the puffed cereal dough pieces are of the size of puffed cereal grains, namely, about 5 to 10 mm. longest dimension. Especially useful herein are puffed cereal dough pieces having a density ranging from about 0.2 to 0.6 g/cc, preferably about 0.3 to 0.4 g/cc.

Especially preferred for use herein due to their crispy attributes are puffed cereal dough pieces comprising a rice-based dough. The puffed cereal dough pieces can be prepared by cooking rice grains in a sugar solution of about 70% water, 24% sugar an the balance malt syrup and salt for a time/temperature sufficient to gelatinize the starch of the rice. Thereafter, the cooked rice is dried to a moisture content of about 22% to 26% and is formed into a dough and pelletized to form pellets having a pellet count of 75-100/10 g, preferably about 95-100/10 g. The pellets are then dried to about 19% to 21% moisture and puffed such as in a jet zone, i.e., hot air fluidized bed, toaster oven to form puffed rice cereal pieces having a moisture content of 2% to 5% and a golden brown color.

3. Fruit Sauce

At refrigerated temperatures, certain embodiments of the emulsion/dry particulate mixture can exhibit a thickened texture. In certain embodiments, the second portion or matrix additionally essentially comprises about 1% to 25% of the second portion of a fruit sauce, especially applesauce. The fruit sauce addition enables a more ready stirring of the two portions of the present products at 40° F. upon consumption. It is desired to employ a fruit sauce material characterized by a long fiber size such as applesauce. Another useful fruit sauce material is washed citrus pulp especially washed orange pulp. Surprisingly, the addition of this high moisture material within the specific levels to the second phase has little substantial adverse effect upon maintenance of the crispy texture of the cereal pieces. Also, the fruit sauce provides nutrition and organoleptic benefits to the present products.

Most surprisingly, utilization of the novel emulsions described herein allow for the fabrication of food products wherein the water activity differential between the two portions can be as great as about 0.2 while nonetheless exhibiting long term, refrigerated shelf stability. Higher water activity differentials may be possible. The present food products thus provide unexpected storage stability superiority, especially compared with comparable products containing puffed cereal pieces dispersed throughout yogurt which quickly become soggy. While not wishing to be bound by the proposed theory, it is speculated herein that the present novel emulsions provide a hydrophobic barrier at a molecular or microscopic level between the first portion and the dispersed cereal pieces of the emulsion/piece portion.

In still another variation of the present invention, the fruit sauce rather than being dispersed throughout the emulsion phase is positioned intermediate the yogurt and emulsion phases, i.e., comprises an interjacent layer. Such a construction provides modest further improvements in maintaining the crisp texture of the puffed cereal pieces. The fruit sauce has a water activity of about 0.5 to 0.7 which is significantly less than the 0.9 $A_w$ value for yogurt while higher than the 0.3 to 0.5 $A_w$ values of the emulsion phase which in turn is higher than the 0.3 or below water activity of the cereal pieces. Thus, the intermediate positioning of the fruit sauce as a soft barrier reduces the water activity differential having moisture into the emulsion phase which over time results in undesirable reductions in crispness.

Without further elaboration, it is believed that one skilled in the art can, using the preceding description, utilize the present invention to its fullest extent. The following specific embodiments are, therefore, to be construed as merely illustrative and not limitative of the invention. It will be appreciated that other modifications of the present invention, within the skill of those in the R-T-E cereal art, can be undertaken without departing from the spirit and scope of the invention.

EXAMPLE 1

A western style yogurt product, i.e., a stirred yogurt topped with a fruit preserve, in accordance with the present invention is prepared as follows.

A stirred style yogurt is prepared from a milk base having the following composition:

| Ingredient | Weight % |
| --- | --- |
| Whole milk (3.8% butterfat) | 84.00 |
| Nonfat dry milk solids | 4.00 |
| Whey protein concentrate (96% solids) | 2.00 |
| Sugar | 10.00 |
| | 100.00% |

The base is blended, homogenized, pasteurized, cooled to incubation temperature and then inoculated and fermented in bulk to form a yogurt. The yogurt is then mixed to break the yogurt's curd to form a stirred yogurt having a high water activity of about 0.9. About 90 g of the stirred yogurt is added to a 6 oz container.

Thereafter, about 80 g of an emulsion phase is added on top of stirred yogurt thereby forming a two-phase western style yogurt product. The emulsion phase has the following composition.

| Ingredient | Weight % |
| --- | --- |
| W/O emulsion | 85.00 |
| Puffed cereal grains | 10.00 |
| Applesauce | 5.00 |
| | 100.00% |

The water-in-oil emulsion is prepared by combining a gelled aqueous phase with a gelled liquid oil phase.

The gelled aqueous phase is prepared from the following ingredients:

| Ingredient | Weight % (of the aqueous phase) |
| --- | --- |
| Glycerol | 2.000 |
| Crystalline fructose | 68.000 |
| Algin (gelling agent)[1] | 0.855 |
| Red dye | 0.005 |
| Dextrose | 8.000 |
| White grape juice concentrate (63%–68% solids) | 4.800 |
| Lemon juice concentrate (400 g/l of acid expressed as citric acid) | 2.800 |
| Water | balance |

[1]Available from Kelco Division of Merck & Co., Inc. under the name Manugel PTJ.

A dry suspension of the algin is first prepared by mixing it with 10% of the fructose and the red dye. This dry mixture is then added to the water and glycerol and mixed. The remaining fructose and the dextrose is then added with slow mixing. Upon completion of the mixing, the mass is heated to 160° F. The resultant solution is allowed to cool to 100° F. after which time the juice concentrates are added to initiate gellation.

The gelled oil phase is prepared from the following ingredients:

| Ingredient | Weight % |
| --- | --- |
| Vegetable oil[1] | 89.83 |
| Emulsifier[2] | 1.25 |
| Oil soluble flavor | 4.18 |
| Fumed silicon dioxide[3] | 2.65 |
| Hydropropyl cellulose[4] (10% by weight in propylene glycol) | 2.09 |
| | 100.00% |

The vegetable oil, emulsifier, and oil soluble flavor are thoroughly mixed together. To this oil solution, 80% of the fumed silicon dioxide is added gradually using a high shear homogenizer. The hydroxypropyl cellulose/propylene glycol is then gradually added to the oil phase using the same homogenizer. Thereafter the remaining 20% fumed silicon dioxide is added with additional high speed shearing.

Thereafter 80 parts of the aqueous phase are slowly added to 20 parts of the gelled oil with slow agitation in a Hobart ™ mixer to form the w/o emulsion. The w/o emulsion had a water activity of 0.65.

The emulsion is then gently admixed with the puffed cereal grains to form the present emulsion phase. The cereal grains are crisp and have a density of 0.3 g/cc and an initial water activity of about 0.25. The emulsion phase is then added to the container on top of the stirred yogurt.

Upon initial preparation, the puffed cereal grains are crisp. The yogurt product is stored at refrigerated temperatures for six weeks. The product is then stirred to mix the yogurt phase and the emulsion phase immediately prior to consumption. Even at refrigerated temperatures, the emulsion phase with applesauce is very easy to stir. Upon consumption, about 75% of the puffed cereal grains remain crisp.

Two-phase yogurt products of the present invention of equivalent ability to maintain the crisp feature of the puffed cereal grains are obtained when the stirred yogurt phase is substituted with an equivalent amount of a Swiss style homogeneous yogurt comprising three parts yogurt to one part fruit preserves.

EXAMPLE 2

A sundae style yogurt, i.e., fruit preserve on the bottom, topped with a custard style product in accordance with the present invention is prepared as follows:

| Ingredient | Weight % |
| --- | --- |
| W/O emulsion | 80.00 |
| Puffed cereal grains | 15.00 |
| Nuts | 5.00 |
| | 100.00% |

The water-in-oil emulsion having an ungelled aqueous phase is prepared as follows:

| Ingredient | Weight % |
| --- | --- |
| Water | 18.00 |
| Flavor | 4.50 |
| Crystalline fructose | 67.50 |
| Dextrose | 9.00 |
| Citric acid | 1.00 |
| | 100.00% |

The fructose, dextrose and citric acid are added to the water and flavor with vigorous agitation. After the addition is complete, the mass is heated to 160° to 170° F. to completely dissolve all the ingredients. This mixture is allowed to cool to ambient temperature.

The gelled oil phase is prepared from the following ingredients.

| Ingredient | Weight % |
| --- | --- |
| Vegetable oil[1] | 90.17 |
| Emulsifier[2] | 1.50 |
| Fumed silicon dioxide[3] (contains 20% oil soluble flavor) | 3.75 |
| Hydroxypropyl cellulose (10% by weight in absolute ethanol) | 4.58 |
| | 100.00% |

The gelled oil is prepared as noted above in Example 1.
[1]An all liquid winterized partially hydrogenated soybean oil available from Capital City Products Company under the trade name Sta-Bland.
[2]A polyglycerol oleate emulsifier available from the Witco Chemical Company under the trade name Witconol 14-F or a decaglycerol decaoleate emulsifier available from Capital City Products Company under the trade name Caprol 10G40.
[3]An oil soluble flavor on fumed silicon to make it free flowing available from Felton Worldwide under the name Natural Strawberry Fortifier or an oil soluble flavor on fumed silicon to make it free flowing available from PFW Division of Hercules, Inc. under the trade name Natural Strawberry Type.

Thereafter, 70 parts of the aqueous phase are slowly added to 30 parts of the gelled oil using a low shear mixer to form the w/o emulsion. The w/o emulsion has a water activity of 0.65%.

The emulsion is then gently admixed with the puffed cereal grains to form the present emulsion phase. Upon initial preparation, the puffed cereal grains are crisp and have a density of about 0.22 g/cc. The emulsion phase is then added to the container.

Thereafter, a custard style yogurt is prepared from a milk base having the following composition:

| Ingredient | Weight % |
| --- | --- |
| Skim milk | 95.45 |
| Nonfat dry milk solids | 4.00 |
| Gelatin (88% solids) | 0.50 |
| Aspartame | 0.05 |
| | 100.00% |

The base (without aspartame) is first pasteurized, cooled to incubation temperature and inoculated and enriched with aspartame. The inoculated yogurt base is then added to the container on top of the emulsion phase, and incubated to allow fermentation to form a yogurt and cooled to form a custard yogurt having a high water activity of about 0.9. About 90 g of the yogurt base is added to a container.

The yogurt product is then stored at refrigerated temperatures for six weeks. Upon consumption, the puffed cereal grains remain crisp.

Two-phase food products of the present invention of equivalent ability to maintain the crisp feature of the puffed cereal pieces are obtained when the custard yogurt phase is substituted with an equivalent amount of pudding or cottage cheese.

EXAMPLE 3

A two-phase sundae style yogurt product in accordance with the present invention having an intermediate fruit sauce layer is prepared as follows:

About 70 g of an emulsion phase is first added to a 6 oz container. The emulsion phase has the following composition:

| Ingredient | Weight % |
| --- | --- |
| W/O emulsion | 70.00 |
| Puffed cereal grains | 20.00 |
| Applesauce | 10.00 |
| | 100.00% |

The water-in-oil emulsion has a gelled aqueous phase having the following composition:

| Ingredient | Weight % (of the aqueous phase) |
| --- | --- |
| Glycerol | 2.000 |
| Crystalline fructose | 68.000 |
| Algin (gelling agent)[1] | 0.855 |
| Red dye | 0.005 |
| Dextrose | 8.000 |
| White grape juice concentrate (6% solids) | 4.800 |
| Lemon juice concentrate (400 g/l of acid expressed as citric acid) | 2.800 |
| Water | balance |

[1]Available from Kelco Division of Merck & Co., Inc. under the name Manugel PTJ.

A dry suspension of the algin is first prepared by mixing it with 10% of the fructose and the red dye. This dry mixture is then added to the water and glycerol and mixed. The remaining fructose and the dextrose is then added with slow mixing. Upon completion of the mixing, the mass is heated to 160° F. The resultant solution is allowed to cool to 100° F. after which time the juice concentrates are added to initiate gellation.

The emulsion further has a gelled oil phase having the following composition:

| Ingredient | Weight % |
| --- | --- |
| Vegetable oil[1] | 89.83 |
| Emulsifier[2] | 1.25 |
| Oil soluble flavor | 4.18 |
| Fumed silicon dioxide[3] | 2.65 |
| Hydropropyl cellulose[4] (10% by weight in propylene glycol) | 2.09 |
| | 100.00% |

[1]An all liquid soybean oil available from the Durkee Industrial Foods Corp. under the trade name Durkex 500.
[2]A polyglycerol ester emulsifier available from the Witco Corp. under the trade name Witconol 14-F.
[3]CAB-O-SIL M5 available from Cabot Corporation.
[4]Klucel-HF supplied by Hercules, Inc.

The vegetable oil, emulsifier, and oil soluble flavor are thoroughly mixed together. To this oil solution, 80% of the fumed silicon dioxide is added gradually using a high shear homogenizer. The hydroxypropyl cellulose/propylene glycol is then gradually added to the oil phase using the same homogenizer. Thereafter the remaining 20% fumed silicon dioxide is added with additional high speed shearing.

Thereafter 80 parts of the aqueous phase are slowly added to 20 parts of the gelled oil with slow agitation in a Hobart ™ mixer to form the w/o emulsion. The w/o emulsion has a water activity of 0.65.

The emulsion is then gently admixed with the puffed cereal grains to form the present emulsion phase. The cereal grains are crisp and have a density of 0.5 g/cc. About 5.0 g of the emulsion phase is then added to the empty container.

Thereafter, about 20 g of applesauce is added to the container on top of the w/o emulsion.

A stirred style yogurt is prepared from a milk base having the following composition:

| Ingredient | Weight % |
| --- | --- |
| Whole milk | 82.00 |
| Nonfat dry milk solids | 5.00 |
| Whey protein concentrate (96% solids) | 1.00 |
| Sugar | 12.00 |
| | 100.00% |

The base is first pasteurized, cooled to incubation temperature and inoculated and fermented to form a yogurt. The yogurt is then mixed to break the yogurt's curd to form a stirred yogurt having a high water activity of about 0.9. About 100 g of the stirred yogurt is added to a container on top of the applesauce thereby forming a three-phase western style yogurt product.

Upon initial preparation, the puffed cereal grains are crisp. The yogurt product is stored at refrigerated temperatures for six weeks. Upon consumption, the puffed cereal grains remain crisp.

Yogurt products of the present invention of equivalent ability to remain crisp are obtained when the applesauce is substituted with an equivalent amount of a fruit preserve of strawberries, cherries, blueberries or washed orange pulp.

EXAMPLE 4

A western style yogurt product, i.e., a stirred yogurt topped with a fruit preserve, in accordance with the present invention is prepared as follows:

A stirred style yogurt is prepared according to the formulation and procedure of Example 1.

About 130 g of the stirred yogurt is added to a 6 oz container.

Thereafter, about 20 g of an emulsion phase is added on top of stirred yogurt thereby forming a two-phase western style yogurt product. The emulsion phase has the following composition.

| Ingredient | Weight % |
| --- | --- |
| W/O emulsion | 82.96 |
| Cereal grains | 17.04 |
| | 100.00% |

The cereal grains comprise three parts granola and one part puffed rice.

The water-in-oil emulsion is prepared by combining a gelled aqueous phase with a gelled liquid oil phase.

The gelled aqueous phase is prepared from the following ingredients:

| Ingredient | Weight % (of the aqueous phase) |
| --- | --- |
| Fruit puree | 22.01 |
| Crystalline fructose | 48.18 |
| Glycerine | 3.63 |
| Red dye | 0.05 |
| Dextrose | 25.69 |
| Water | balance |

The gelled oil phase is prepared from the following ingredients:

| Ingredient | Weight % |
| --- | --- |
| Vegetable oil[1] | 95.52 |
| Emulsifier[2] | 1.28 |
| Fumed silicon dioxide[3] | 2.74 |
| Hydroxypropyl cellulose[4] (10% by weight in propylene glycol) | 0.46 |
| | 100.00% |

[1]An all liquid soybean oil available from the Durkee Industrial Foods Corp. under the trade name Durkex 500.
[2]A polyglycerol ester emulsifier available from the Witco Corp. under the trade name Witconol 14-F.
[3]CAB-O-SIL M5 available from Cabot Corporation.
[4]Klucel-HF supplied by Hercules, Inc.

The vegetable oil and emulsifier are thoroughly mixed together. To this oil solution, 80% of the fumed silicon dioxide is added gradually using a high shear homogenizer. The hydroxypropyl cellulose/propylene glycol is then gradually added to the oil phase using the same homogenizer. Thereafter the remaining 20% fumed silicon dioxide is added with additional high speed shearing.

Thereafter 75 parts of the aqueous phase are slowly added to 25 parts of the gelled oil with slow agitation in a Hobart ™ mixer to form the w/o emulsion. The w/o emulsion had a water activity of 0.65.

The emulsion is then gently admixed with the cereal grains to form the present emulsion phase. The cereal pieces and grains are crisp and have a water activity of about 0.2. The emulsion phase is then added to the container on top of the stirred yogurt.

Upon initial preparation, the cereal pieces are dry and crisp. The yogurt product is stored at refrigerated temperatures for six weeks. The product is then stirred to mix the yogurt phase and the emulsion phase immediately prior to consumption. Upon consumption, about 75% of the puffed cereal grains remain crisp.

Two-phase yogurt products of the present invention of equivalent ability to maintain the crisp feature of the puffed cereal grains are obtained when the stirred yogurt phase is substituted with an equivalent amount of a Swiss style homogeneous yogurt comprising three parts yogurt to one part fruit preserves.

What is claimed is:

1. A composite food product having food phases of differing texture without a discrete intermediate solid barrier, comprising:
   A. about 10% to 90% by weight of the product of a first, wet food phase having a first relatively higher water activity of at least 0.7, and
   B. about 10% to 90% by weight of the product of a second food phase in direct contact with the first food phase without an intermediate discrete solid barrier having a second relatively lower, below about 0.7 water activity said second food phase comprising:

1. about 70% to 95% by weight of the second food phase of a water-in-oil emulsion including
   (a) about 8% to 50% by weight of the emulsion of a continuous gelled oil phase, said oil phase comprising an edible oil having a melting point of less than 70° F.,
   (b) about 50% to 92% by weight of the emulsion of a dispersed aqueous phase, said aqueous phase comprising sufficient quantities of water soluble solids to have a water activity ranging from about 0.4 to 0.8, and
   (c) sufficient amounts of a water-in-oil emulsifier to form a stable emulsion,
2. about 5% to 30% by weight of the product of dry, cereal pieces dispersed throughout the emulsion, said cereal pieces having a water activity of about 0.1 to about 0.3.

2. The food product of claim 1 wherein the first food phase comprises a cultured dairy product.

3. The food product of claim 2 wherein the continuous oil phase comprises about 2% to 6% by weight of the oil phase of an oil gelling agent dispersed therein.

4. The food product of claim 3 wherein the oil gelling agent comprises fumed silicon dioxide and
wherein the aqueous phase of the emulsion includes about 0.1% to 2% by weight of the aqueous phase of an aqueous phase gelling agent.

5. The food product of claim 4 wherein the cereal pieces comprise puffed pieces, and wherein the cultured dairy product is yogurt.

6. The food product of claim 5 wherein the gelling agent additionally comprises a member selected from the group consisting of glycerol, sorbitol, propylene glycol, absolute alcohol and mixtures thereof.

7. The food product of claim 6 wherein the yogurt is a stirred yogurt style having a viscosity (35° F.) ranging from about 5,000 to 15,000 cps.

8. The food product of claim 7 wherein the second food phase additionally comprises:
3. about 1% to 25% by weight of the second phase of a fruit sauce.

9. The food product of claim 8 wherein the first food phase additionally comprises about 1% to 25% by weight of the first food phase of a fruit sauce.

10. The food product of claim 7 wherein the yogurt is a custard style yogurt.

11. The food product of claim 10 wherein the second food phase is positioned lower relative to the first food phase.

12. The food product of claim 6 wherein the aqueous phase of the emulsion has a water activity of about 0.3 to 0.7.

13. The food product of claim 1, 2, 3, 4, 6, 7, 8, 9, 10, 11 or
wherein the cereal pieces comprise puffed wheat cereal grains.

14. A composite food product having food phases of differing texture having an intermediate fruit sauce layer comprising:
A. about 10% to 89% by weight of the product of a first, wet food phase having a first relatively higher water activity of at least 0.7;
B. about 10% to 89% by weight of the product of a second food phase having a second relatively lower, below about 0.7 water activity, said second food phase comprising:
1. about 70% to 95% by weight of the second food phase of a water-in-oil emulsion including
   (a) about 8% to 50% by weight of the emulsion of a continuous gelled oil phase, said oil phase comprising an edible oil having a melting point of less than 70° F.,
   (b) about 50% to 92% by weight of the emulsion of a dispersed aqueous phase, said aqueous phase comprising sufficient quantities of water soluble solids to have a water activity ranging from about 0.4 to 0.8, and
   (c) sufficient amounts of a water-in-oil emulsifier to form a stable emulsion,
2. about 5% to 30% by weight of the product of dry, puffed cereal pieces dispersed throughout the emulsion, said cereal pieces having a water activity of about 0.1 to about 0.3; and
C. about 1% to 20% by weight of the product of a first fruit sauce intermediate the first and second food phases.

15. The food product of claim 14 wherein the first food phase comprises a cultured dairy product.

16. The food product of claim 15 wherein the continuous oil phase comprises about 2% to by weight of the oil phase of an oil gelling agent dispersed therein.

17. The food product of claim 16 wherein the oil gelling agent comprises fumed silicon dioxide, and
wherein the aqueous phase of the emulsion includes about 0.1% to 2% by weight of the aqueous phase of an aqueous phase gelling agent and wherein the cultured dairy product is yogurt.

18. The food product of claim 17 wherein the cereal pieces comprise puffed pieces of rice dough.

19. The food product of claim 18 wherein the gelling agent additionally comprises glycerol, sorbitol, propylene glycol, absolute alcohol and mixtures thereof and wherein the first fruit sauce is selected from the group consisting of applesauce and washed orange pulp.

20. The food product of claim 19 wherein the yogurt is a stirred yogurt style having a viscosity (35° F.) ranging from about 5,000 to 15,000 cps.

21. The food product of claim 20 wherein the second food phase additionally comprises:
3. about 1% to 25% by weight of the second phase of a second fruit sauce.

22. The food product of claim 21 wherein the first food phase additionally comprises about 1% to 25% by weight of the first food phase of a third fruit sauce.

23. The food product of claim 19 wherein the yogurt is a custard style yogurt.

24. The food product of claim 23 wherein the second food phase is positioned lower relative to the first food phase.

25. The food product of claim 19 wherein the aqueous phase of the emulsion has a water activity of about 0.3 to 0.7.

26. The food product of claim 14, 15, 16, 17, 19, 20, 21, 22, 23, 24 or 25
wherein the cereal pieces comprise puffed wheat cereal grains.

* * * * *

UNITED STATES PATENT AND TRADEMARK OFFICE
CERTIFICATE OF CORRECTION

PATENT NO. : 4,952,414
DATED : August 28, 1990
INVENTOR(S) : Stephen P. Kaufman, James E. Langler, Vinod W. Padhye It is certified that error appears in the above-identified patent and that said Letters Patent is hereby corrected as shown below:

Col. 10, line 21 - Footnotes should be inserted after the first Table in Column 10.

-- 1 An all liquid soybean oil available from the Durkee Industrial Foods Corp. under the trade name Durkex 500.
2 A polyglycerol ester emulsifier available from the Witco Corp. under the trade name Witconol 14-F.
3 CAB-O-SIL M5 available from Cabot Corporation.
4 Klucel-HF supplied by Hercules, Inc. --

Col. 10, line 59 - Insert this paragraph after "as follows:"

-- First, about 50g of an emulsion phase is added to the bottom of a container. The emulsion phase has the following composition. --

Col. 13, line 9 - "5.0" should be -- 50 --.

Col. 15, line 58 - "11 or" should be -- 11 or 12 --.

Col. 16, line 27 - "to by" should be -- to 6% by --.

Signed and Sealed this

Third Day of December, 1991

Attest:

HARRY F. MANBECK, JR.

*Attesting Officer*   *Commissioner of Patents and Trademarks*